US011347039B2

(12) United States Patent
Khosravani

(10) Patent No.: US 11,347,039 B2
(45) Date of Patent: May 31, 2022

(54) OPTICAL IMAGING AND SCANNING OF HOLES

(71) Applicant: The Boeing Company, Chicago, IL (US)

(72) Inventor: Shahriar Khosravani, Everett, WA (US)

(73) Assignee: The Boeing Company, Chicago, IL (US)

(*) Notice: Subject to any disclaimer, the term of this patent is extended or adjusted under 35 U.S.C. 154(b) by 330 days.

(21) Appl. No.: 16/419,478

(22) Filed: May 22, 2019

(65) Prior Publication Data

US 2020/0371332 A1 Nov. 26, 2020

(51) Int. Cl.
 *G02B 21/00* (2006.01)
 *G02B 26/08* (2006.01)

(52) U.S. Cl.
 CPC ..... *G02B 21/0024* (2013.01); *G02B 21/0032* (2013.01); *G02B 21/0044* (2013.01); *G02B 21/0048* (2013.01); *G02B 26/0833* (2013.01)

(58) Field of Classification Search
 CPC ...... G02B 21/10; G02B 21/084; G02B 21/16; G02B 21/06; G02B 21/082; G02B 21/125; G02B 21/365; G02B 21/002; G02B 21/086; G02B 21/14; G02B 21/26; G02B 21/00; G02B 21/0032; G02B 21/0088;

(Continued)

(56) References Cited

U.S. PATENT DOCUMENTS

| 3,013,467 A * | 12/1961 | Minsky ............ G02B 21/002 356/432 |
| 5,162,941 A | 11/1992 | Favro et al. |
| 5,686,674 A | 11/1997 | Lowry et al. |

(Continued)

FOREIGN PATENT DOCUMENTS

| DE | 102004043209 A1 | 3/2006 |
| DE | 202017006788 U1 | 5/2018 |
| WO | 2015036026 A1 | 3/2015 |

OTHER PUBLICATIONS

Extended European Search Report dated Oct. 30, 2020 in European Patent Application No. 20171771.7 (European counterpart to the instant U.S. patent application).

*Primary Examiner* — William R Alexander
*Assistant Examiner* — Sharrief I Broome
(74) *Attorney, Agent, or Firm* — Ostrager Chong Flaherty & Broitman P.C.

(57) ABSTRACT

Methods and apparatus for optical imaging and scanning of holes machined, drilled or otherwise formed in a substrate made of composite or metallic material. The method utilizes an optical instrument for imaging and scanning a hole in combination with an image processor configured (e.g., programmed) to post-process the image data to generate one complete planarized image without conical optical distortion. The optical instrument includes an optical microscope with confocal illumination and a conical mirror axially positioned to produce a full 360-degree sub-image with conical distortion. In the post-processing step, a mathematical transformation in the form of computer-executable code is used to transform the raw conical sub-images to planar sub-images. The planarized sub-images may be stitched together to form a complete planarized image of the hole.

15 Claims, 11 Drawing Sheets

(58) Field of Classification Search
CPC ........ G02B 21/02; G02B 21/12; G02B 21/18;
G02B 21/32; G02B 21/36; G02B 5/005
See application file for complete search history.

(56) References Cited

U.S. PATENT DOCUMENTS

| | | |
|---|---|---|
| 9,733,462 B2 | 8/2017 | Yamazaki |
| 10,009,526 B2 | 6/2018 | Kisner et al. |
| 10,168,287 B2 | 1/2019 | Georgeson et al. |
| 10,281,705 B2 | 5/2019 | Knebel |
| 2005/0168593 A1 | 8/2005 | Akizuki et al. |
| 2007/0206200 A1* | 9/2007 | Lindner ............... G01B 11/303 356/511 |
| 2015/0067929 A1 | 3/2015 | Blanton et al. |
| 2016/0363543 A1 | 12/2016 | Georgeson et al. |
| 2018/0067051 A1 | 3/2018 | Baribeau |

\* cited by examiner

AXIAL SCAN FOR DEEP HOLES

Reference Point

OPTICAL IMAGING AND SCANNING OF HOLES

BACKGROUND

This disclosure generally relates to methods and apparatus for inspecting holes machined in a workpiece or structure and, in particular relates to methods and apparatus for inspecting holes designed to receive fasteners.

Lightweight composite materials (such as fiber-reinforced plastic material) are being used more extensively in the aerospace industry for both commercial and military aircraft and other aerospace vehicles, as well as in other industries. The structures using these composite materials may be formed using multiple plies or layers of material that may be laminated together to form high-strength structure. At least one method for fastening multiple layers of material together is to clamp up the layers, drill holes, and then insert some type of fastener into the holes and thereby secure the layers together.

In the field of manufacturing, frequent measurement and inspection are undertaken to ensure that manufactured parts conform to design specifications. This includes the inspection of holes, such as drilled holes, to ensure that the holes are of the desired shape and configuration, e.g. diameter and alignment, within engineering tolerances. Ensuring conformance of production parts to design specifications is of particular concern in industries such as aerospace manufacturing, where exacting production standards are maintained.

To ensure compliance of drilled holes with their design specifications, it has generally been the practice either to have a quality control or quality assurance inspector examine each hole, or to use statistical techniques to analyze a sampled number of holes. Inspection may be performed by manually inserting a hole diameter probe, such as a capacitance-based probe, an air pressure hole probe, a laser hole probe, or a ball-type probe, into a hole to check its compliance with or variation from design specifications. One technique for optical imaging of composite or metallic holes can only acquire shallow-depth images at offset angles with respect to the hole center line (hereinafter, the "Z-axis") due to the very narrow field-of-view of standard microscopes along an optical axis (which is the same as the Z-axis of the hole). Such optical imaging is also unable to produce a full 360-degree planar image of a hole in a single focal plane.

It would be advantageous to provide an apparatus that can scan along the Z-axis inside holes in a structure to assess the condition of the hole.

SUMMARY

The subject matter disclosed in detail below is directed to methods and apparatus for optical imaging and scanning of holes machined, drilled or otherwise formed in a substrate made of composite or metallic material. The method described herein utilizes an optical instrument for imaging and scanning a hole in combination with an image processor configured (e.g., programmed) to post-process the image data to generate one complete planarized image without conical optical distortion. In accordance with some embodiments, the optical instrument includes an optical microscope with confocal illumination and a conical mirror axially positioned to produce a full 360-degree sub-image with conical distortion. In the post-processing step, a mathematical transformation in the form of computer-executable code is used to transform the raw conical sub-images to planar sub-images. The planarization of the sub-images is done using a simple mathematical transformation of image bits. The planarized sub-images may be stitched together to form a complete planarized image of the hole.

By design, microscopes use lenses and/or mirrors to focus light onto an image sensor such as a focal plane array of opto-electrical elements that convert impinging light to electrical signals (hereinafter "array of photodetectors") that represent pixel data of an image. As used herein, the term "photodetector" means a device that is capable of emitting electrons in response to photons impinging on a surface of the device. The apparatus includes a 90-degree "conical mirror" installed on a moving stage that is movable in a direction parallel to Z-axis of the hole while the axis of the cone is co-axial with the Z-axis of the hole. It should be appreciated, however, that a truncated conical mirror (a.k.a. "frusto-conical mirror") may also be used. A mirror having a reflective surface that is either conical or frusto-conical will be referred to herein as a "conical mirror".

The subject matter disclosed in detail below is further directed to an automated high-speed method for inspecting holes in structures to be fastened and a computer-controlled apparatus for performing that inspection method. In accordance with various embodiments, the apparatus comprises a multi-motion inspection head mounted on a scanning bridge, an end of a robotic arm, or a robotic crawler vehicle. The multi-motion inspection head comprises the aforementioned optical instrument and a motorized multi-stage probe placement head that is operable for displacing the optical instrument along X, Y and Z axes to achieve multiple sequenced motions. The optical instrument is attached to a mandrel that is rotatably coupled to an X-axis (or Y-axis) stage for rotation about the Z axis. Smart servo or stepper motors with feedback control are used to move the optical instrument into place and then scan inside each hole in succession. In accordance with one embodiment, the apparatus comprises various directional motorized stages that are sequenced and controlled for the specific motions needed to inspect rows of holes.

In accordance with some embodiments, the microscope and light source of the optical instrument are contained within a housing that is carried by the multi-motion inspection head. The optical instrument further includes an optical probe (e.g., a conical mirror and associated support structure) that extends downward from the housing. The optical probe is sized and shaped to fit inside a hole to be inspected. The multi-motion inspection head is configured to move the microscope until the optical axis of the optical probe is aligned with the center line (Z-axis) of the hole and then insert the probe into the hole until the optical probe is at a starting depth inside the hole. The image sensor of the microscope then acquires sub-images of the interior surface of the hole at different depths. In accordance with one proposed implementation, the multi-motion inspection head moves the optical probe along the Z-axis of the hole intermittently and the image sensor acquires raw conical sub-images in the time intervals during which the optical probe is stationary. After one hole has been fully inspected, the optical probe is removed from that hole and then inserted into the next hole to be inspected. In this manner, a multiplicity of holes in a row of holes may be inspected in succession.

In accordance with some embodiments, light from a light source is directed axially (or nearly axially) into the hole during image acquisition. Axially propagating light is directed radially outward toward a confronting portion of the hole. This radial re-direction of the illumination light is achieved using a conical mirror. The conical mirror has a conical (or frusto-conical) surface, the apex of which is disposed along the optical axis of the microscope. The conical mirror receives axially (or nearly axially) propagating light from the light source and reflects the light radially outward to illuminate a confronting 360-degree portion of the hole in which the optical probe is inserted.

The method proposed herein provides a simple yet thorough optical inspection. Also hole surface roughness and hole diameter variation can be assessed fully in a single scan. Instead of providing only local information within the probe's curvature radius, the optical inspection technique disclosed herein produces a full 360-degree view.

Although various embodiments of methods and apparatus for optical imaging and scanning of holes are described in some detail later herein, one or more of those embodiments may be characterized by one or more of the following aspects.

One aspect of the subject matter disclosed in detail below is an imaging device comprising: a housing; a light source disposed inside the housing; an image sensor disposed inside the housing; a conical mirror disposed outside the housing and having a cone axis; a conical mirror support structure that supports the conical mirror in a fixed position relative to the housing; and an optical subassembly supported by the housing and configured so that light from the light source impinges on the conical mirror and is reflected radially outward by the conical mirror and light propagating radially inward and impinging on the conical mirror is directed onto the image sensor.

In accordance with some embodiments of the optical instrument described in the immediately preceding paragraph, the conical mirror support structure comprises a central post; and the conical mirror is truncated and attached to one end of the central post. In accordance with other embodiments, the conical mirror support structure comprises a circular cylindrical glass tube having a cylinder axis; and the conical mirror is disposed inside the circular cylindrical glass tube so that the cone axis is coaxial with the cylinder axis.

Another aspect of the subject matter disclosed in detail below is a method for imaging a hole in a substrate, the method comprising: (a) placing a conical mirror into a hole with a cone axis coaxial with a hole center line and with an apex or truncated portion of the conical mirror at a first depth which is less than a second depth of a base of the conical mirror; (b) illuminating the conical mirror with light that is focused onto a focal plane inside the hole; (c) reflecting the light recited in step (b) radially outward toward the hole using the conical mirror; (d) reflecting returning light axially upward toward the opening using the conical mirror; (e) directing light reflected axially upward by the conical mirror in step (d) onto an image sensor; and (f) converting light that impinges on the image sensor into electrical signals that represent pixel data of a first distorted sub-image of a first portion of the hole having conical optical distortion. The method further comprises processing the pixel data of the first distorted sub-image to produce pixel data representing a first planarized sub-image without conical optical distortion.

The method described in the immediately preceding paragraph may further comprise: (g) moving the conical mirror along the hole center line to a position where the apex or truncated portion of the conical mirror is at a third depth which is closer to the second depth than to the first depth; (h) illuminating the conical mirror with light that is focused onto the focal plane inside the hole; (i) reflecting the light recited in step (h) radially outward toward the hole using the conical mirror; (j) reflecting returning light of the light recited in step (i) axially upward toward the opening using the conical mirror; (k) directing light reflected axially upward by the conical mirror in step (j) onto an image sensor; and (I) converting light that impinges on the image sensor into electrical signals that represent pixel data of a second distorted sub-image of a second portion of the hole having conical optical distortion. In this case, the method further comprises: processing the pixel data of the first distorted sub-image to produce pixel data representing a first planarized sub-image without conical optical distortion; processing the pixel data of the second distorted sub-image to produce pixel data representing a second planarized sub-image without conical optical distortion; stitching the first and second planarized sub-images together; and presenting a planarized image on a display device, which planarized image includes at least the first and second planarized sub-images.

A further aspect of the subject matter disclosed in detail below is an apparatus for imaging a hole in a substrate, comprising: a multi-stage probe placement head comprising a block assembly, a first stage which is translatable relative to said block assembly along a first axis, a second stage which is translatable relative to said block assembly along a second axis orthogonal to said first axis, and a third stage which is translatable relative to said block assembly along a third axis orthogonal to said first and second axes, said third stage being translatably coupled to said second stage, and said second stage being translatably coupled to said first stage; and an optical instrument supported by and depending from the third stage, wherein the optical instrument comprises: a housing coupled to and translatable with the third stage; a light source disposed inside the housing; an image sensor disposed inside the housing; a conical mirror disposed outside the housing and having a cone axis parallel to the first axis; a conical mirror support structure that supports the conical mirror in a fixed position relative to the housing; and an optical subassembly supported by the housing and configured so that light from the light source impinges on the conical mirror and is reflected radially outward by the conical mirror and light propagating radially inward and impinging on the conical mirror is directed onto the image sensor.

A further aspect of the subject matter disclosed in detail below is a system for imaging a hole in a substrate, comprising: an automated apparatus configured to move an end effector by operation of motors, an optical instrument mounted to the end effector, and an image processor configured to receive a conically optically distorted image acquired by the optical instrument and then process pixel data of the conically optically distorted image to produce pixel data representing a planarized image without conical optical distortion. The optical instrument comprises: a housing coupled to the end effector; a light source disposed inside the housing; an image sensor disposed inside the housing; a conical mirror disposed outside the housing and having a cone axis parallel to the first axis; a conical mirror support structure that supports the conical mirror in a fixed position relative to the housing; and an optical subassembly supported by the housing and configured so that light from the light source impinges on the conical mirror and is reflected radially outward by the conical mirror and light propagating radially inward and impinging on the conical mirror is directed onto the image sensor.

Other aspects of methods and apparatus for optical imaging and scanning of holes are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of methods and apparatus for optical imaging and scanning of holes are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Methods and apparatus for optical imaging and scanning of holes machined, drilled or otherwise formed in a substrate made of composite or metallic material will now be described in some detail for the purpose of illustration. The method involves inserting an optical probe having a conical mirror inside a hole, capturing a 360-degree sub-image of a portion of the hole, and then sending the sub-image data to an image processor configured (e.g., programmed) to generate a planarized sub-image without conical optical distortion. Multiple planarized sub-images may be stitched together to form a complete planarized image of the hole.

Figure 1:
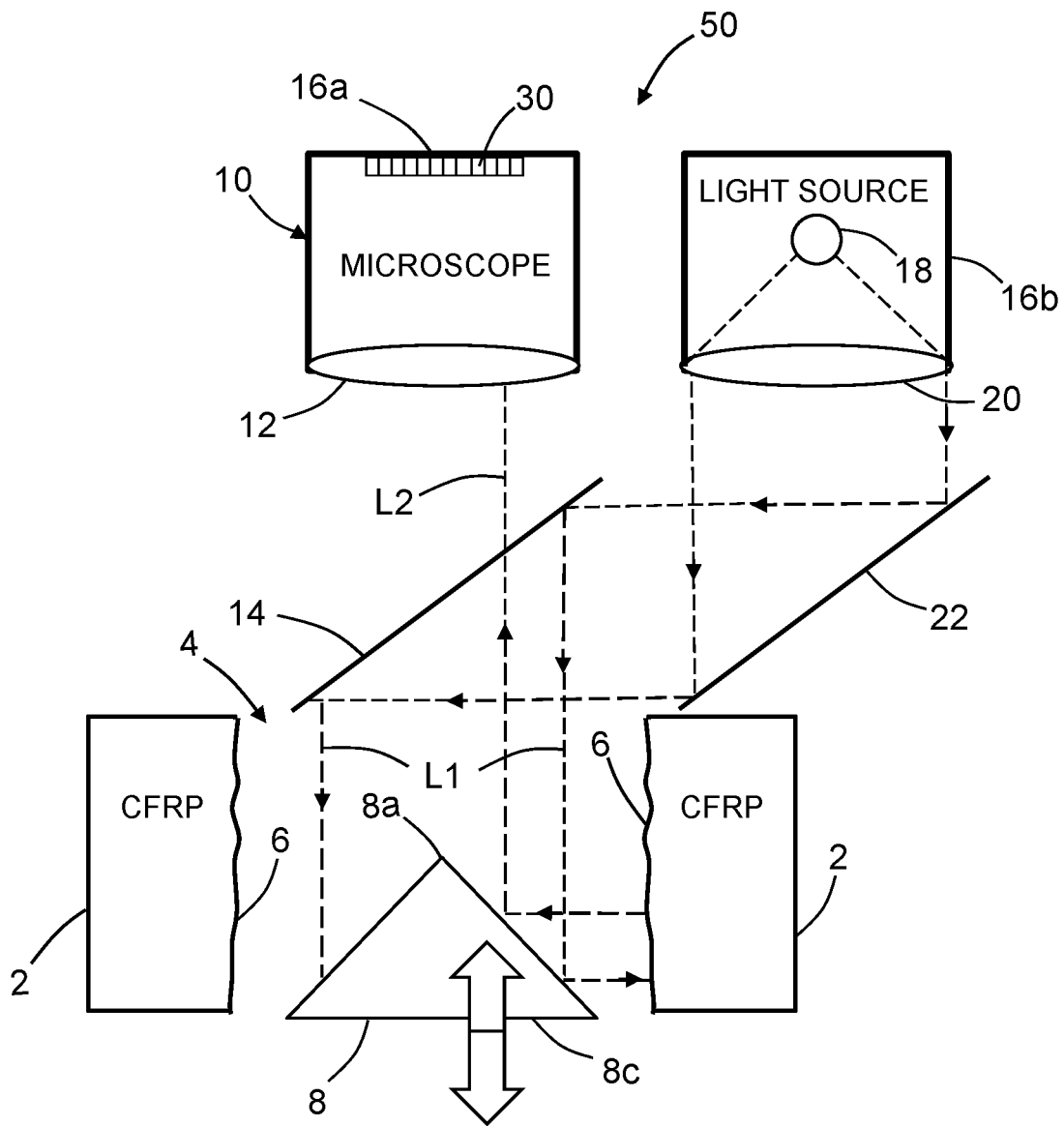
FIG. 1 is a diagram showing the principle of operation of an optical instrument suitable for imaging a hole using a conical mirror in accordance with one embodiment.

FIG. 1 is a diagram showing the principle of operation of an optical instrument 50 suitable for imaging a hole 6 in a substrate 2 made of composite material (e.g., carbon fiber-reinforced plastic). The optical instrument 50 includes a microscope 10 having a housing part 16a and a light source 18 inside a housing part 16b. Other parts of the optical instrument housing are not shown in FIG. 1. An image sensor (not shown in FIG. 1) is disposed inside the housing part 16a of microscope 10. The light source 18 is disposed inside the housing part 16b. In accordance with some embodiments, the light source 18 is a monochromatic point light source.

The optical instrument 50 further includes a conical mirror 8 which is sized to fit inside the hole 6. The conical mirror 8 is disposed outside the housing of the optical instrument 50 and has a cone axis. The conical mirror is supported in a fixed position relative to the housing of the optical instrument 50 by means of a conical mirror support structure (not shown in FIG. 1). The conical mirror 8 has a geometric shape which is defined by revolving a line around the cone axis, which line is disposed at an angle equal to 45 degrees relative to the cone axis. In accordance with the implementation partially depicted in FIG. 1, the conical mirror 8 has an apex 8a and a base 8c. However, it should be appreciated that the conical mirror 8 may be truncated in alternative embodiments.

The optical instrument 50 partially depicted in FIG. 1 further includes an optical subassembly supported by the housing. The optical assembly includes an objective lens 12 supported by the housing part 16a, a lens 20 supported by the housing part 16b, and a dichroic mirror 14 and a mirror 22 supported by a housing part not shown. The dichroic mirror 14 and a mirror 22 are both disposed at an angle of 45 degrees relative to the optical axis of the objective lens 12 The optical subassembly is configured so that light (indicated by dashed arrows L1) from the light source 18 impinges on the conical mirror 8. The conical mirror 8 reflects the impinging light radially outward toward a confronting portion of hole 6. In addition, radially inwardly propagating light returning from hole 6 and impinging on the conical mirror 8 is reflected toward the objective lens 12 by the conical mirror 8. To avoid clutter in the drawing, FIG. 1 shows only one light ray L2 being returned to the microscope 10.

In accordance with some embodiments, light L1 from light source 18 source is directed axially (or nearly axially) toward the conical mirror 8 by mirror 22 and dichroic mirror 14 during image acquisition. More specifically, light impinging on mirror 22 is reflected onto dichroic mirror 14. Dichroic mirror 14 then reflects light from the light source at an angle parallel to the optical axis of the microscope 10. Axially propagating light impinging on the conical mirror 8 is reflected radially outward toward a confronting portion of hole 6. The apex 8a of conical mirror 8 is disposed along the optical axis of the microscope 10. The conical mirror 8 receives axially (or nearly axially) propagating light and reflects the light radially outward to illuminate a confronting 360-degree ring-shaped portion of hole 6. Some of that light is scattered by the hole 6 back toward the conical mirror 8. The conical mirror 8 then reflects that radially inwardly propagating light axially upward toward the dichroic mirror 14, which transmits the light to the objective lens 12.

The dichroic mirror 14 allows transmission of light having a wavelength in a certain range and reflects light having wavelengths outside that range. Dichroic mirror 14 may be designed to reflect light from light source 18 and to transmit light received from the conical mirror 8. The dichroic mirror 14 is disposed at an angle of approximately 45 degrees relative to the optical axis of the microscope 10. The 45-degree orientation is preferred to maximize the effectiveness of the dichroic mirror and reflect incident light at a right angle. One example of a dichroic mirror is a PYREX™ substrate having a borosilicate crown glass coating. The specific wavelengths selected to be reflected or passed can be controlled through careful selection of mirrors and coatings. Typically, after the ring-shaped hole portion 6a absorbs the light reflected radially outward by the conical mirror 8, the re-emission (scattering) of light happens at longer wavelengths. Therefore, the illumination must be chosen at shorter wavelength to have a better discrimination of the scattered light back to the image sensor 30. For example, using a dichroic mirror that is set to transmit red light and reflect blue light, blue light from the light source 18 is reflected by the dichroic mirror 14 toward the conical mirror 8. The blue light illuminating the ring-shaped hole portion 6a will cause the CFRP surface to produce scattered red light (which has a wavelength longer than the wavelength of blue light). The red light will be transmitted by the dichroic mirror toward the image sensor 30 inside the microscope 10.

Figure 2:
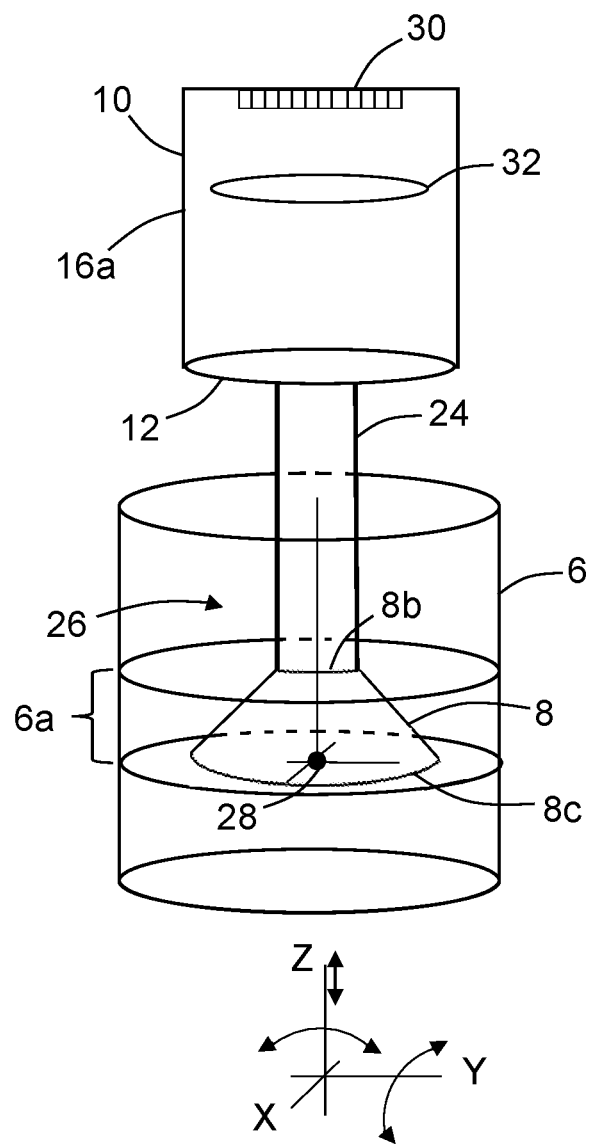
FIG. 2 is a diagram showing a hole that will be illuminated when downwardly axially propagating light is reflected radially outward toward a ring-shaped portion of the hole by a conical mirror.

The image sensor 30 converts impinging photons into electrons and outputs image data representing a full 360-degree sub-image of the ring-shaped portion 6a of hole 6 with conical optical distortion. In a post-processing step, the raw conical sub-image is transformed into a planarized sub-image without conical optical distortion. The planarized image may then be further processed to evaluate the shape and configuration of hole 6. Thus, a system implementing the principle of operation depicted in FIG. 1 can be used to scan a hole in a depthwise direction and produce a planarized image of the hole containing information characteristic of the particular hole. For example, the planarized image may be processed to determine whether the shape and configuration (e.g. diameter, orientation and surface roughness) of the hole are within engineering tolerances FIG. 2 is a diagram showing a hole 6 that will be illuminated when downwardly axially propagating light impinges on and is reflected radially outward toward a ring-shaped portion 6a of hole 6 by the reflective surface of a conical mirror 8. In accordance with the embodiment depicted in FIG. 2, the conical mirror support structure that supports the conical mirror 8 in a fixed position relative to the housing part 16a is a central rod 24 having a linear axis and a circular cross section. In one proposed implementation, the axis of the central rod 24 is coaxial with the optical axis of the microscope 10. The center of X-Y rotational alignment is indicated by point 28 in FIG. 2

In the example depicted in FIG. 2, a truncated portion 8b of the conical mirror 8 is attached to one end of central rod 24. The microscope 10 further includes an image sensor 30 and an image-erecting lens 32 (hereinafter "second lens 32") that is supported by the housing part 16a at a position between objective lens 12 and image sensor 30. The image sensor 30 may comprise a staring focal plane array, such as a charge coupled device (CCD) sensitive to visible or infrared wavelengths.

As previously described, the ring-shaped portion 6a of hole 6 is illuminated by light which propagates axially into the hole, impinges on the reflective surface of the conical mirror 8, and is then reflected by that reflective surface radially outward. Some of the light reflected onto the ring-shaped portion 6a of hole 6 is reflected or scattered back toward the reflective surface of the conical mirror 8, which in turn reflects returning light toward the objective lens 12. The objective lens 12 of the microscope 10 forms an image in a first image plane that is perpendicular to the optical axis of the microscope 10. The second lens 32 receives light from the objective lens 12 and focuses that light to form an image in a second image plane coincident with the photoconductive surfaces of the image sensor 30. As a result, the image sensor 30 (e.g., an array of photodetectors) acquires a raw conical sub-image of the ring-shaped portion 6a of hole 6.

Figure 3:
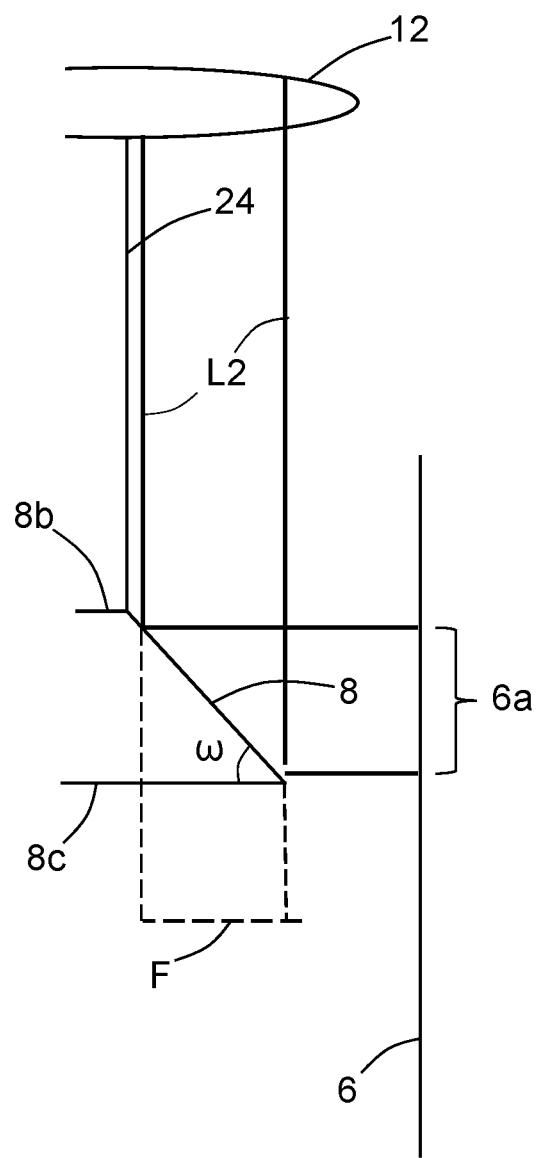
FIG. 3 is a diagram showing a portion of FIG. 2 on a magnified scale.

FIG. 3 is a diagram showing a portion of FIG. 2 on a magnified scale. The inclined reflective surface of the conical mirror 8 is disposed at a cone angle ω relative to the base 8c. The height of the ring-shaped portion 6a of hole 6 that is illuminated by light reflected by the reflective surface of conical mirror 8. In the case where the cone angle ω is equal to 45 degrees, the height of the illuminated ring-shaped portion 6a of hole 6 is equal to the distance separating the two light rays L1 indicated in FIG. 3, which in this example represent the radially innermost and radially outermost light rays propagating parallel to the cone axis and impinging on the reflective surface of the conical mirror 8. In an alternative example not shown in FIG. 3, the height of the illuminated ring-shaped portion 6a of hole 6 may equal the height of the conical mirror (e.g., the distance between the truncated portion 8b and the base 8c). The illuminating light has a focal plane F (indicated by a horizontal dashed line in FIG. 3) positioned at a distance below the base 8c of the conical mirror 8.

In accordance with one proposed implementation, the conical mirror 8 is intermittently translated along the center line (Z-axis) of hole 6 by a predetermined distance and a respective raw conical sub-image is captured at each vertical position. In the time interval following each movement, the conical mirror 8 is stationary while the image sensor 30 (see FIG. 2) acquires a raw conical sub-image. After one hole has been fully inspected along the entire depth of the hole, the optical probe is removed from that hole and then inserted into the next hole to be inspected. In this manner, a multiplicity of holes in a row of holes may be inspected in succession.

Figure 4:
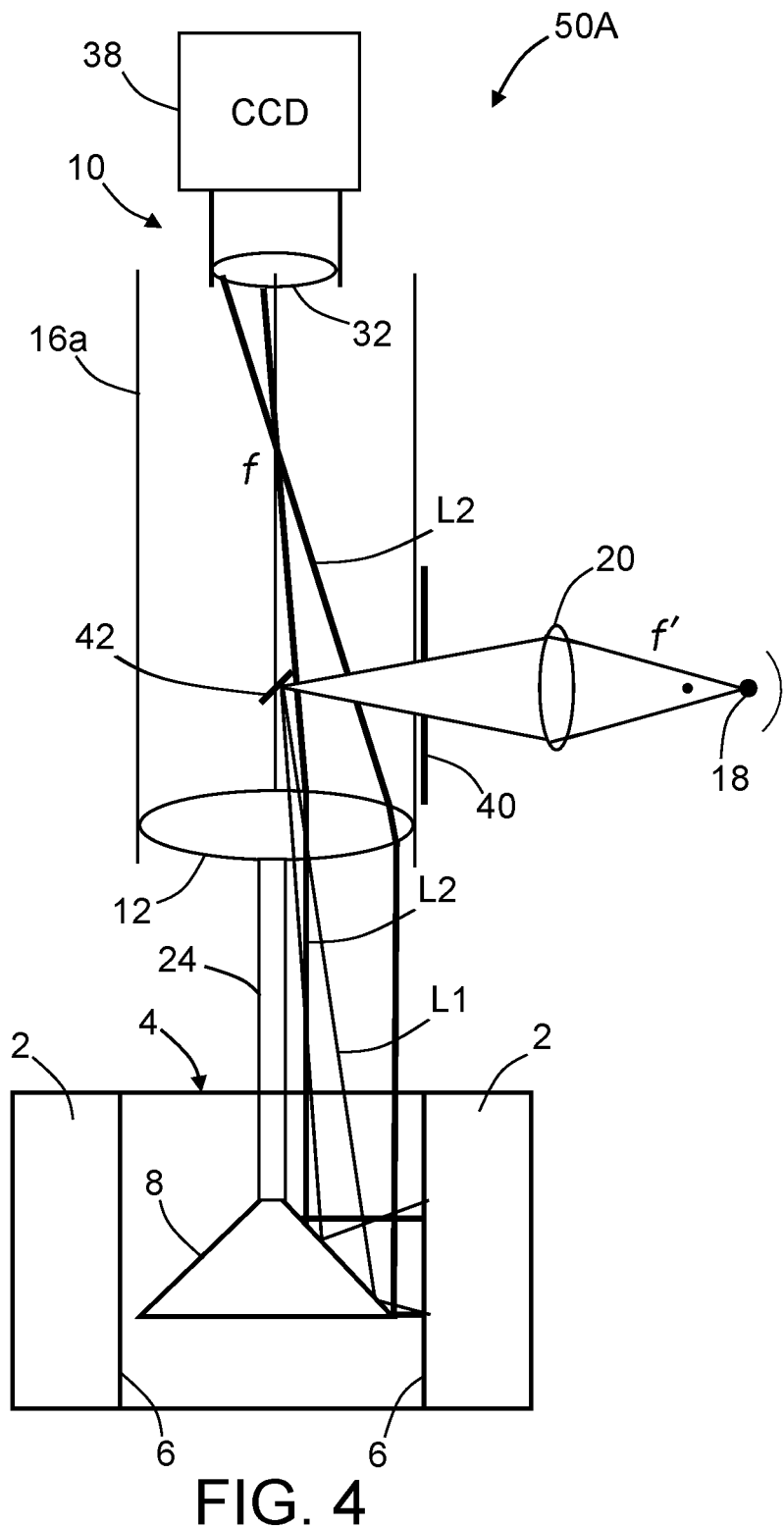
FIG. 4 is a diagram depicting structural and functional aspects of an optical instrument suitable for imaging a hole using a conical mirror supported by a central rod in accordance with one example embodiment.

FIG. 4 is a diagram depicting structural and functional aspects of an optical instrument 50A suitable for imaging a hole 6 using a conical mirror 8 supported by a central rod 24 with coaxial imaging and confocal illumination in accordance with one example embodiment. The axes of the central rod 24 and conical mirror 8 are coaxial with the optical axis of the microscope 10. The optical instrument 50A further includes a light source 18, a lens 20 and a small 45-degree mirror 42. The lens 20 is configured to focus the light from light source 18 onto the small 45-degree mirror 42. An aperture plate 40 is disposed between the lens 20 and the small 45-degree mirror 42. The small 45-degree mirror 42 reflects the impinging light toward the objective lens 12 of the microscope 10. The light from light source 18 is transmitted by the objective lens 12 toward the opening 4 of hole 6 and onto the reflective surface of the conical mirror 8 for illuminating the ring-shaped portion of the hole 6 to be imaged.

In the example embodiment depicted in FIG. 4, the microscope 10 further includes a second lens 32 and a charge coupled device image sensor 38 (hereinafter "CCD image sensor 38"). (Although not shown in FIG. 4, the CCD image sensor 38 is supported by the housing part 16a of the microscope 10.) In a CCD image sensor, the photodetectors are p-doped metal-oxide-semiconductor capacitors. These capacitors are biased above the threshold for inversion when image acquisition begins, allowing the conversion of incoming photons into electron charges at the semiconductor-oxide interface; the CCD is then used to read out these charges. The small 45-degree mirror 42 is sized to not obstruct light propagating from the objective lens 12 to the second lens 32. For example, the small 45-degree mirror 42 may be sized to fit within the shadow produced by the central rod 24. Thus, the light reflected upward by the conical mirror 8 passes through the objective lens 12, around the small 45-degree mirror 42, and through the second lens 32 and then impinges on the CCD image sensor 38. The objective lens 12 has a first image plane located at point f. The second lens 32 has a second image plane located at the CCD image sensor 38.

Figure 5:
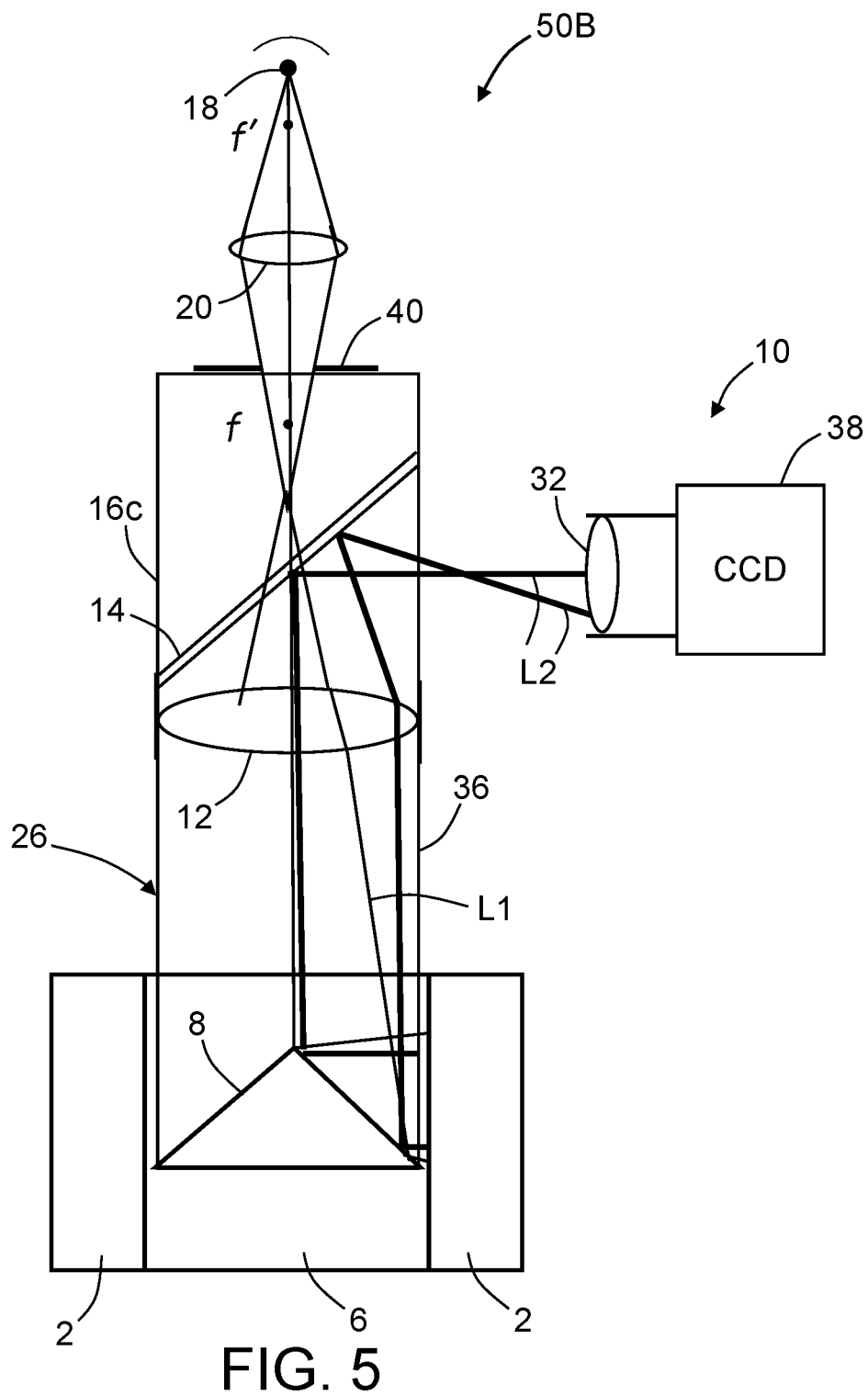
FIG. 5 is a diagram depicting structural and functional aspects of an optical instrument suitable for imaging a hole using a conical mirror supported by a glass tube in accordance with another example embodiment.

FIG. 5 is a diagram depicting structural and functional aspects of an optical instrument 50B suitable for imaging a hole 6 using a conical mirror 8 supported by a glass support tube 36 with coaxial illumination and confocal imaging in accordance with another example embodiment. The glass support tube 36 has respective anti-reflection coatings on its internal and external surfaces. The optical instrument 50B includes a light source 18, a lens 20, an aperture plate 40, a dichroic mirror 14 and an objective lens 12. The light from the light source 18 propagates through lens 20, aperture plate 40, dichroic mirror 14 and objective lens 12 and into the hole 6. The light from light source 18 is transmitted onto the reflective surface of the conical mirror 8 for illuminating the ring-shaped portion of the hole 6 to be imaged.

In the example embodiment depicted in FIG. 5, the microscope 10 further includes a second lens 32 and a CCD image sensor 38. The light reflected upward by the conical mirror 8 passes through the objective lens 12 and is then reflected by the dichroic mirror 14 toward the second lens 32. Then the second lens 32 focuses the impinging light onto the photoconductive surfaces of the CCD image sensor 38.

In accordance with one embodiment, the system for imaging a hole in a substrate further comprises an image processor configured (e.g., programmed) to receive a conically optically distorted image acquired by the optical instrument and then process the pixel data of the conically optically distorted image to produce pixel data representing a planarized image without conical optical distortion. In one proposed implementation, the image processor is programmed to execute a planarization algorithm that comprises the following steps: converting the pixel data having image sensor coordinates to pixel data having cylindrical coordinates corresponding to the hole surface and then unrolling the cylindrical shell of the hole surface to a flattened two-dimensional surface having X- and Y-axes (different than the X- and Y-axes of the X-Y-Z coordinate system depicted in FIG. 2; the new Y-axis of the flattened two-dimensional coordinate system is parallel to the Z-axis of the X-Y-Z coordinate system). This transformation converts a flat two-dimensional Cartesian system (i.e., the image sensor pixel positions) of the recorded reflected image of the hole surface from the conical mirror 8 to a new unfolded flat two-dimensional Cartesian system that represents the hole surface if it were flattened. The result is that the conically optically distorted image is transformed to a planarized image without conical optical distortion.

Figure 6A:
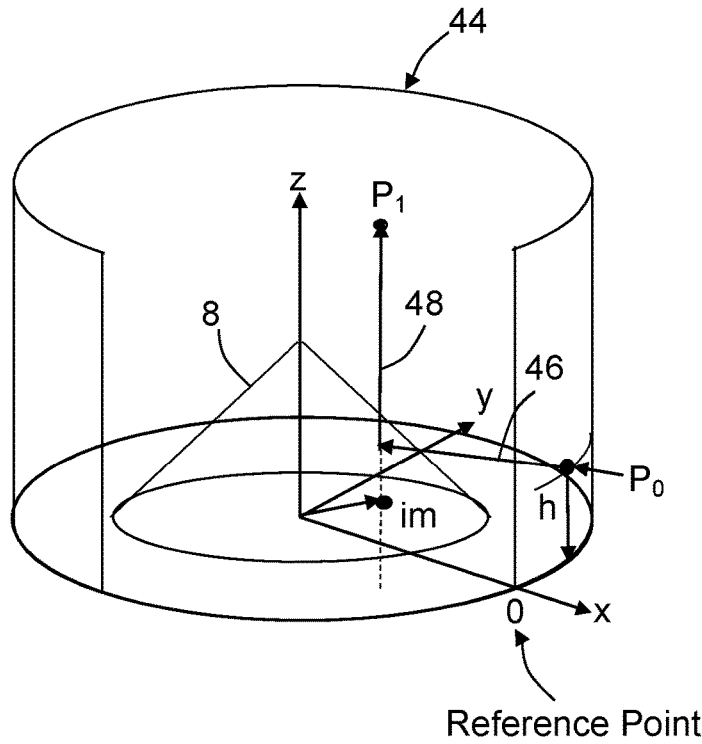
FIG. 6A is a diagram showing the geometric relationship of a circular cylindrical frame of reference for a hole and a conical mirror inserted in the hole and further showing a point on the hole surface and the corresponding point on the image detected by an image sensor.
Figure 6B:
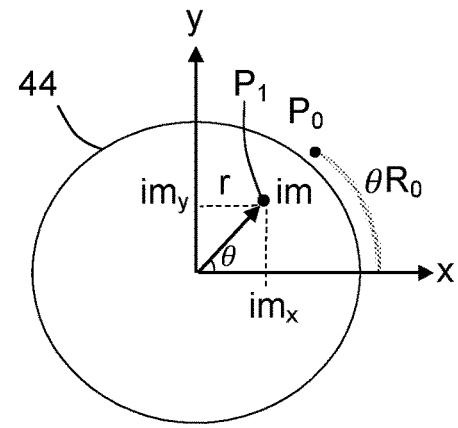
FIG. 6B is a diagram showing the location of an image point in a polar coordinate system centered on the circular cylindrical frame of reference for the hole.

FIG. 6A is a diagram showing the geometric relationship of a circular cylindrical frame of reference 44 for hole and a conical mirror 8 having a cone axis which is coaxial with the Z-axis of the hole. A point on the hole surface which has been imaged is represented by point $P_0$ in FIG. 6A. The corresponding point on the image detected by the image sensor is represented by point $P_1$ in FIG. 6A and has coordinates in the frame of reference of the image sensor equal to ($im_x$, $im_y$). FIG. 6B is a diagram showing the location of an image point in a polar coordinate system centered on the circular cylindrical frame of reference 44 for the hole.

Figure 6C:
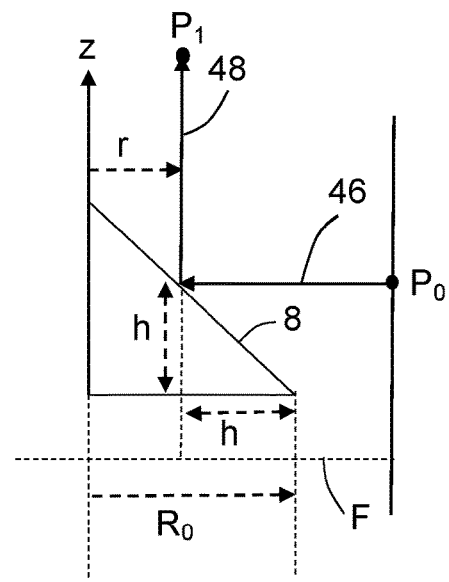
FIG. 6C is a diagram showing a light ray which emanates from a point on the hole surface, is reflected by a conical mirror and then producing an image point on an image sensor.

FIG. 6C is a diagram showing a light ray which first propagates from point P0 radially inward along a path 46 perpendicular to the Z-axis, is reflected 90 degrees by the conical mirror, and then propagates upward along a path 48 until the light ray impinges on the image sensor, thus producing the image point $P_1$. As best seen in FIG. 6C, the maximum radius of the conical mirror 8 is equal to $R_0$, while the distance from the Z-axis to the point where the light ray impinged on the conical mirror 8 is equal to r. The angle between the X-axis and a vector connecting the origin of the X-Y coordinate system of the image sensor to the image point $P_1$ is indicated by θ in FIG. 6B.

The first step in the planarization algorithm is to convert the image coordinates ($im_x$, $im_y$) and height h of point P1 to the polar coordinates r and θ seen in FIG. 6B:

$$r = R_0 - h \ \& \ \theta = \mathrm{Tan}^{-1}\left(\frac{im_y}{im_x}\right)$$

The second step in the planarization algorithm is to flatten the circular cylindrical frame of reference 44 and then convert the polar coordinates r and θ to image coordinates ($im_x'$, $im_y'$) of point $P_0$ in a planarized image, where $im_x'$ is equal to the arc length $\theta R_0$ (shown in FIG. 6B) from the reference point O to the point $P_0$ and $im_y'$ is equal to the height $h = R_0 - r$ of point $P_0$ (shown in FIG. 6A):

$$im_x' = \theta R_0 = R_0 \mathrm{Tan}^{-1}\left(\frac{im_y}{im_x}\right)$$

$$im_y' = R_0 - r = R_0 - \sqrt{im_x^2 + im_y^2}$$

The above-described conic-to-planar transformation is performed on every image point acquired from a hole to produce a planarized image of the hole. That image is then displayed to technicians for the purpose of enabling a visual inspection of the hole. The planarization algorithm disclosed herein may be employed in conjunction with optical instruments having different configurations, but sharing the common feature that the optical probe to be inserted in each hole includes a conical mirror.

Figure 7:
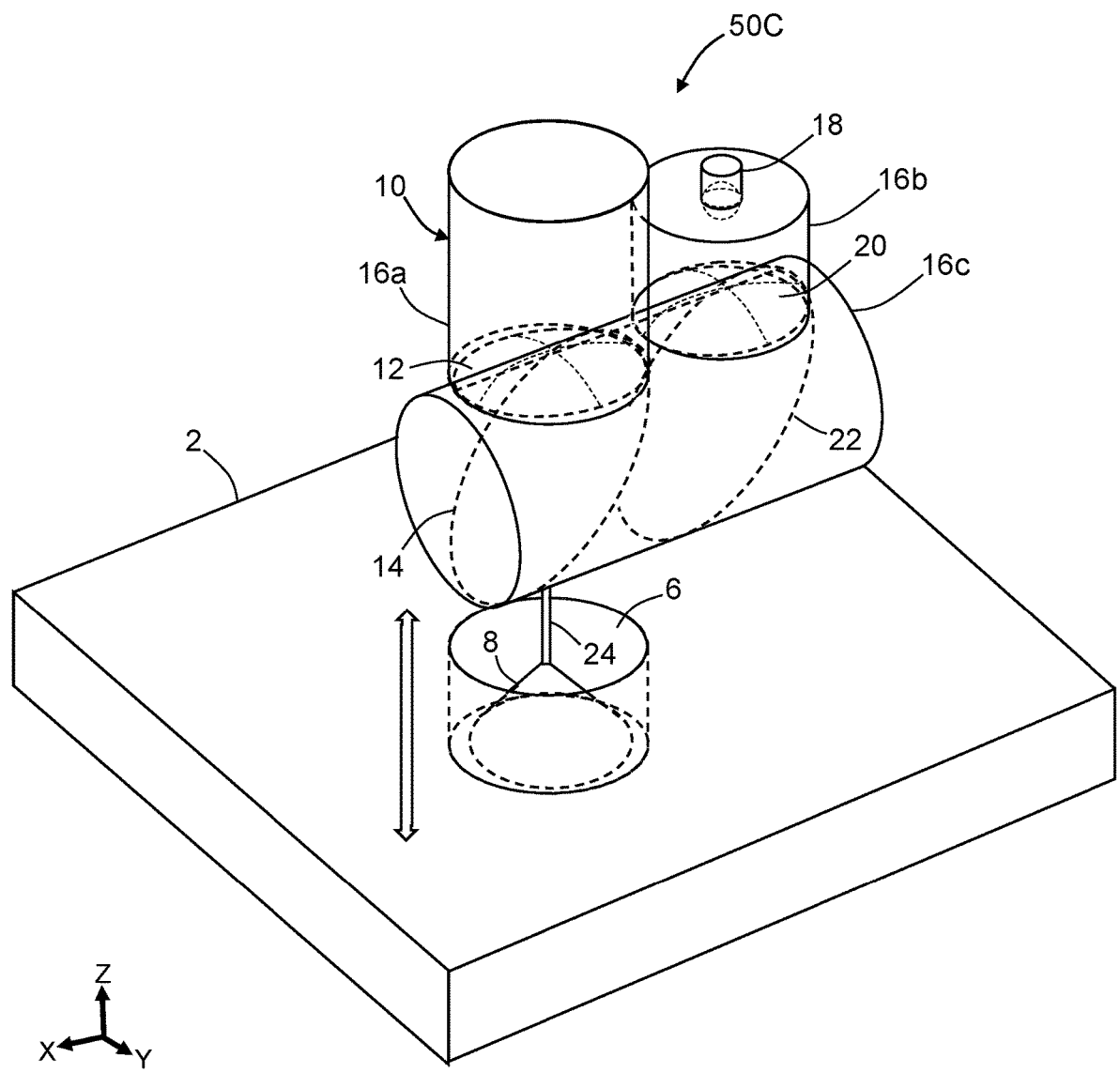
FIG. 7 is a diagram representing a three-dimensional view of an optical instrument suitable for imaging a hole using a conical mirror supported by a central rod, which conical mirror is shown inside the hole.

FIG. 7 is a diagram representing a three-dimensional view of an optical instrument 50C having a conical mirror 8 supported by a central rod 24 inside a hole 6 in a substrate 2. The double-headed arrow indicates that the optical instrument 50C is movable vertically along a Z-axis which is coaxial with the axis of the hole 6. The housing of the optical instrument 50C includes: (a) a housing part 16a that houses components of the microscope 10; (b) a housing part 16b that houses the light source 18; and a housing part 16c that houses an optical subassembly that includes a dichroic mirror 14 and a mirror 22 (indicated by a dashed ellipses) both disposed at 45-degree angles relative to the axis of the objective lens 12. The objective lens 12 is supported by the housing part 16a. A lens 20 is supported by the housing part 16b. Light from the light source 18 is transmitted by lens 20, reflected by mirror 22, reflected downward by dichroic mirror and then impinges on the conical mirror 8. Returning light from the hole 6 is reflected upward by the conical mirror 8, transmitted by the dichroic mirror 14 and objective lens 12, and then impinges on the image sensor (not shown in FIG. 7) inside the microscope 10.

Figure 8:
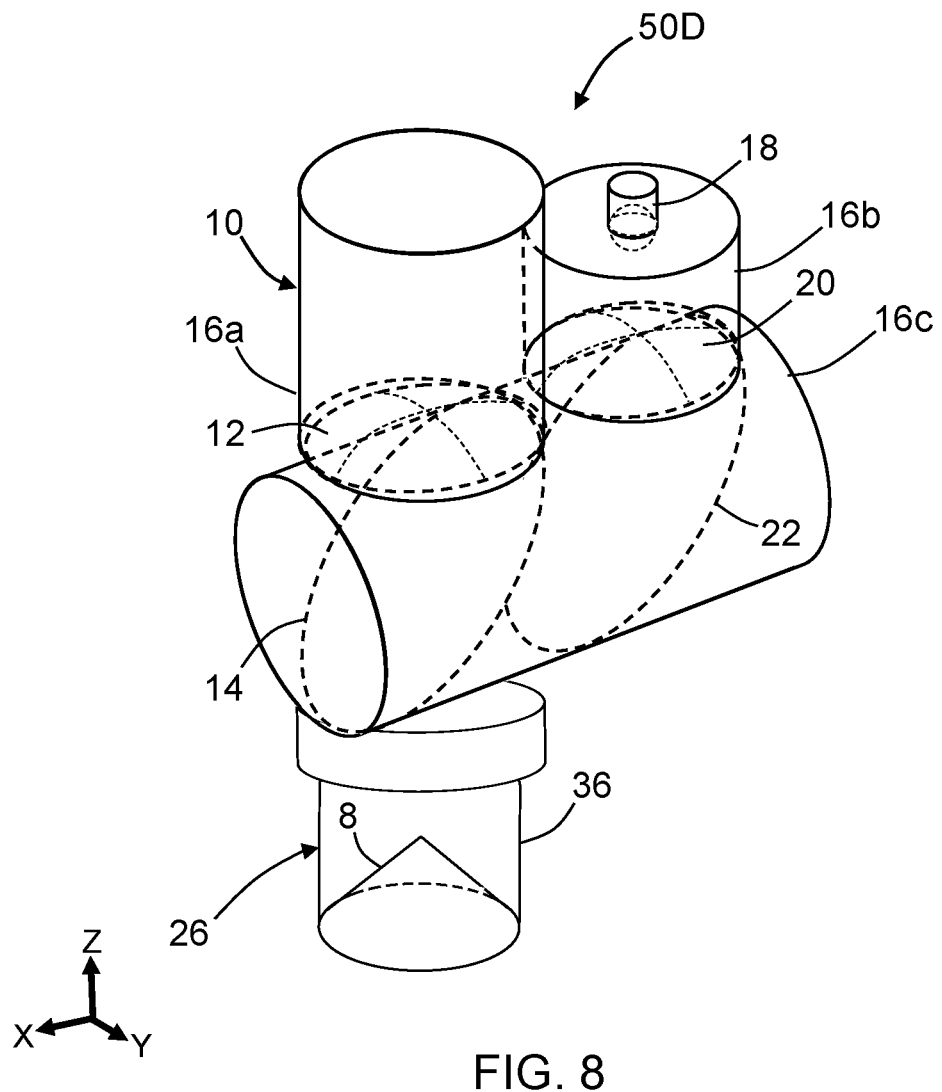
FIG. 8 is a diagram representing a three-dimensional view of an optical instrument suitable for imaging a hole using a conical mirror supported by a glass tube in accordance with a further example embodiment.

FIG. 8 is a diagram representing a three-dimensional view of an optical instrument 50D having a conical mirror 8 supported by a central glass tube 36 instead of a central rod 24. Other components depicted in FIG. 8 have the same structure and functionality as like-numbered components depicted in FIG. 7 and described in the immediately preceding paragraph.

Figure 9:
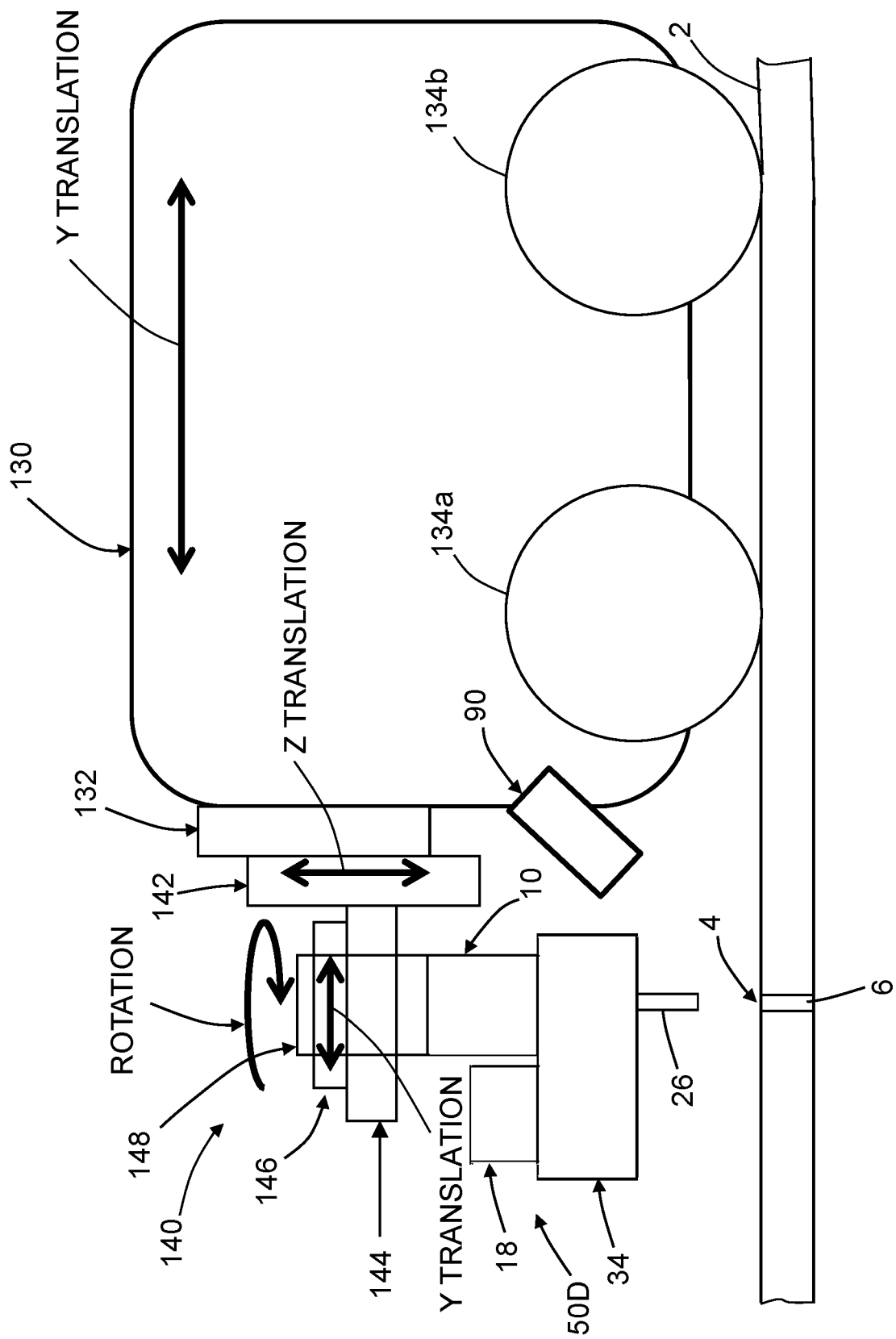
FIG. 9 is a diagram representing a side view of a crawler vehicle carrying an optical instrument of the type depicted in FIG. 8.

FIG. 9 is a diagram representing a side view of a crawler vehicle 130 having a multi-stage probe placement head 140 mounted on its forward end in accordance with one embodiment. The multi-stage probe placement head 140 supports an optical instrument 50D, which can be used to image a hole 6 in a substrate 2 (such as a fuselage skin). Although only one hole 6 is shown, a multiplicity of holes 6 are typically arranged in rows. The optical instrument 50D is shown in a position where the optical probe 26 is vertically aligned with a hole 6, e.g., an optical axis of the optical probe 26 is coaxial with a center line of the hole 6. During an inspection procedure, the optical instrument 50D is placed at different depths inside the hole 6 and is activated to capture respective images at each depth.

The crawler vehicle 130 may take the form of a remotely operated vacuum-enabled robot capable of holonomic motion along a surface which is non-horizontal using wheels and suction devices (e.g., fans driven by motors mounted on a frame of the crawler vehicle 130). In the embodiment depicted in FIG. 9, only two wheels 122a and 122b of a set of four wheels are visible; the suction devices are not shown. Rotation of Mecanum-type wheels driven by their respective motors (not shown) mounted on the frame of the crawler vehicle 130 enable holonomic motion. Holonomic motion, where turning and translating are decoupled, enables scanning in any direction within the X-Y plane. The crawler vehicle 130 may be steered for movement in an X-Y plane, with the X axis being parallel to a row of holes 6 being inspected. Movement of the crawler vehicle 130 along a row of holes 6 is indicated by the long double-headed arrows labeled "Y TRANSLATION" in FIG. 9.

A video camera 90 is mounted on the crawler vehicle 130. The video camera 90 can be oriented so that its field-of-view will include a volume of space under the multi-stage probe placement head 140. The video camera 90 captures imaging data and sends that imaging data to a computer (not shown in FIG. 9). The communication channel between the video camera 90 and the computer can be via an electrical cable or wireless. The computer will use the imaging feedback provided by the video camera 90 to control precision alignment of the optical instrument 50D with the hole 6 to be inspected.

Still referring to FIG. 9, the multi-stage probe placement head 140 comprises a block assembly 132 attached to the crawler vehicle 130, a Z-axis stage 142 translatably coupled to the block assembly 132, a X-axis stage 144 translatably coupled to the Z-axis stage 142, and a Y-axis stage 146 translatably coupled to the X-axis stage 144. A mandrel 148 is rotatably coupled to the Y-axis stage 146. The optical instrument 50D is attached to the mandrel 148, i.e., the mandrel 148 and optical instrument 50D rotate in unison. The three stages of the probe placement head 140 can be driven by motors for causing the optical instrument 50D to move in the X, Y or Z directions respectively. The Z-axis stage 142 is used to raise or lower the optical instrument 50D. The X-axis stage 144 and Y-axis stage 146 provide precision motion for centering the optical instrument 50D on the hole 6. The X, Y and Z axes are mutually orthogonal axes in the coordinate frame of reference of the crawler vehicle 130. In an ideal inspection scenario, the Z axis of the crawler vehicle 130 will be parallel to the center line of the hole 6 being inspected. Multiple motions using smart servo or stepper motors (not shown in FIG. 9) with feedback control (based on imaging data acquired by video camera 90) are used to precisely position the optical instrument 50D relative to the hole 6. When proper placement has been realized, the optical instrument 50D can then be lowered so that the optical probe 26 is inserted into the hole 6. To enable rotation of the optical instrument 50D (e.g., to avoid interference between optical instrument 50D and an obstacle), the mandrel 148 can be driven to rotate by a stepper motor (not shown in FIG. 9).

The system depicted in FIG. 9 is capable of inspecting holes 6 arranged in rows, for example, on an aircraft fuselage, using the optical instrument 50D that is moved from hole to hole in succession. When the optical instrument 50D is in proximity to the next hole 6, then the video camera 90 captures imaging data that is used to determine the position of the optical instrument 50D relative to the hole 6. Then X- and Y-stage motors (not shown) on the multi-stage probe placement head 140 can be operated to translate the optical instrument 50D in the X and/or Y directions until the optical instrument 50D and hole 6 are aligned. Then the glass support tube 36 can be lowered to the start position inside the hole 6 and the hole 6 can be scanned.

In the scenario depicted in FIG. 9, the optical instrument 50D is shown in a starting position in which a center line of the optical instrument 50D is approximately coaxial with the center line of the hole 6. The double-headed arrows in FIG. 9 indicate various movements which resulted in the scenario depicted in FIG. 9. First, the crawler vehicle was moved from a position where the optical instrument 50D was not in proximity to the hole 6 to a position where the optical instrument 50D was in proximity to but not yet aligned with the hole 6 (this position is not shown in FIG. 9). In the scenario depicted, the crawler vehicle 130 was translated along the X axis, which is parallel to the row of holes to which hole 6 belongs. When the hole 6 was within the field-of-view of the video camera 90, the crawler vehicle 130 was commanded to stop. While the crawler vehicle 130 and the optical instrument 50D were stationary, the video camera 90 was activated to acquire image data representing the field-of-view, which included the opening 4 of hole 6.

That image data was then processed by a computer (not shown in FIG. 9) using pattern recognition software to determine a location of a center line of the hole 6 in a frame of reference of the crawler vehicle 130. The computer then used the location of the hole center line to determine a difference between the current position and the desired starting position (shown in FIG. 9) of the optical instrument 50D in the frame of reference of the crawler vehicle 130. Thereafter, while the crawler vehicle 130 was stationary, the optical instrument 50D was moved in the X and/or Y directions from its current position to the starting position (movement in the Y direction is indicated by a double-headed arrow in FIG. 9; movement in the X direction is not indicated). Then the optical instrument 50D was lowered from the start position into the hole 6 by activating the motor (not shown) mechanically coupled to the Z-axis stage 142 (movement in the Z direction is indicated by a double-headed arrow in FIG. 9).

In accordance with the embodiment of the system depicted in FIG. 9, the X-, Y- and Z-axis stages may be translatably coupled by means of respective linear-motion bearings. These translatable stages may be mechanically coupled to respective stepper motors (see probe placement head motors 54 in FIG. 10) by any suitable drive mechanism known in the art. For example, each stage could have a respective attached nut which threadably engages a respective lead screw which is driven to rotate by a respective stepper motor, thereby converting the rotation of the motor output shaft into translation of the stage.

Figure 10:
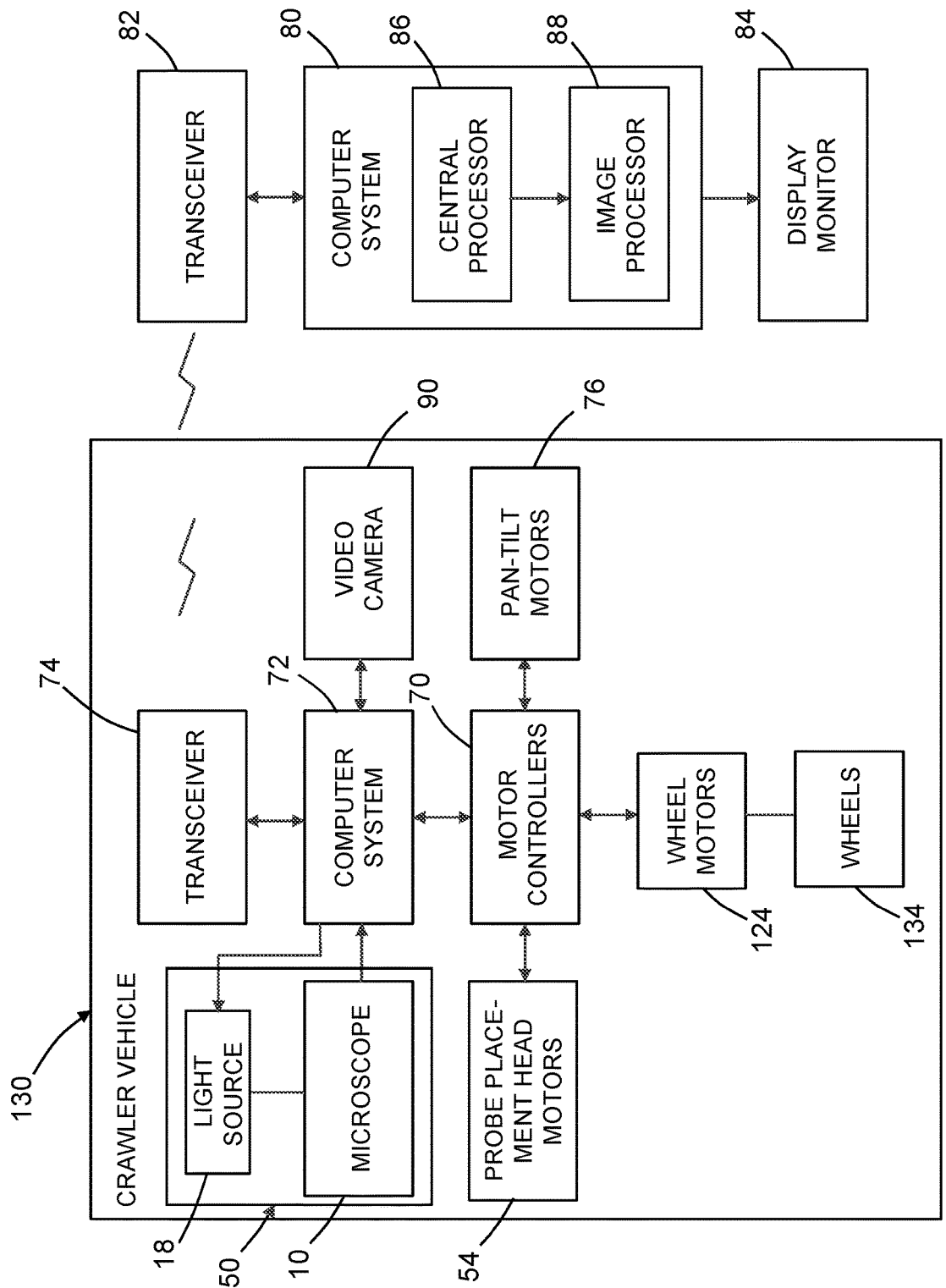
FIG. 10 is a block diagram identifying some components of a computer-controlled apparatus for optical imaging and scanning of holes in accordance with one embodiment.

FIG. 10 is a block diagram identifying some components of a computer-controlled crawler vehicle 122 platform for optical imaging and scanning of holes in accordance with one embodiment. The crawler vehicle 130 includes a video camera 90 mounted to a pan-tilt unit (not shown) and an optical instrument 50 mounted to the multi-stage probe placement head 140. Both the pan-tilt unit and multi-stage probe placement head 140 are mounted to the frame of the crawler vehicle 122. The optical instrument includes a microscope 10 and a light source 18 as previously described. The operations of the optical instrument 50 and the video camera 90 are controlled by the computer system 72, which may be configured with programming stored in a non-transitory tangible computer-readable storage medium (not shown).

The crawler vehicle 130 carries four wheel motors 124, which respectively drive rotation of four wheels 122. In the case wherein the crawler vehicle is equipped with suction devices for vacuum adherence to inclined surfaces, the crawler vehicle may be further equipped with a plurality of EDF motors (not shown in the drawings) which drive rotation of a respective plurality of electric ducted fans. The probe placement head 140 supports a plurality of probe placement head motors 54, three of which drive translation of the optical instrument 50D along X, Y and Z axes respectively and one of which drives rotation of the optical instrument 50D about the Z axis. The pan-tilt unit includes pan-tilt motors 76 which drive rotation of the video camera 90 about pan and tilt axes respectively.

All of the motors received electrical power from power supplies via switches on a relay board (not shown in the drawings). The states of those switches are controlled by a computer system 72 onboard the crawler vehicle 130. The computer system 72 may comprise a general-purpose computer programmed with motion control application software comprising respective software modules for controlling the various stepper motors. The computer system 72 outputs control signals to motor controllers 70 which selectively activate/deactivate each motor in accordance with those control signals.

In particular, the computer system 72 may be programmed to execute radiofrequency commands received from a ground-based computer system 80. Those radiofrequency commands are transmitted by a transceiver 82 which is communicatively coupled to the ground-based computer system 80, received by a transceiver 74 onboard the crawler vehicle 122, converted into the proper digital format and then forwarded to the onboard computer system 72. The computer system 72 then controls: (a) the movements of the crawler vehicle 122 relative to the substrate; (b) the movements of the optical instrument 50 and video camera 90 relative to the frame of the crawler vehicle 122; and (3) the acquisition of images by the optical instrument 50 and video camera 90. Thus, the operation of the equipment onboard the crawler vehicle 122 may be controlled by an operator interacting with the ground-based computer system 80.

In particular, the probe placement head motor that drives displacement of the Z-axis stage 142 (hereinafter "Z-axis stage motor") may be controlled to place the glass support tube 36 at a vertical position such that the apex or truncated portion of the conical mirror is positioned at a first depth in the hole 6. While the conical mirror is stationary at the first depth, a first 360-degree image of the hole 6 is then acquired. Then the Z-axis stage motor is controlled to place the glass support tube 36 at a vertical position such that the apex or truncated portion of the conical mirror is positioned at a second depth (different than the first depth) in the hole 6. For example, the distance separating the first and second depths may be equal to the height of the optical mirror. While the conical mirror is stationary at the second depth, a second 360-degree image of the hole 6 is then acquired. These process steps may be repeated until the hole 6 has been imaged along its entire depth. At the end of this process, the acquired sub-images are planarized; then the planarized sub-images are stitched together to provide one planarized image of the entire hole 6.

In accordance with one proposed implementation, the ground-based computer system 80 includes a central processor 86 and an image processor 88. The central processor 86 is configured (e.g., programmed) to send commands to the computer system 72 via transceiver 82 to control movements of the optical instrument 50 and video camera 90 and the acquisition of image data by the optical instrument 50 and video camera 90. The central processor is further configured to receive image data acquired by the optical instrument 50 and video camera 90 via transceiver 82 and send that image data to the image processor 88. The image processor 88 is configured (e.g., programmed) to process the image data. In particular, the image processor 88 is programmed to execute an algorithm that converts conically optically distorted sub-images acquired by the optical instrument 50 into respective planarized sub-images. The image processor 88 is further programmed to execute an algorithm that stitches the planarized sub-images together to form a planarized image suitable for display on a display monitor 84. The display monitor 84 includes a display processor that may be configured to display a planarized image of the hole 6 in one window and video images of the area of the substrate 2 surrounding the opening 4 in another window.

Figure 11:
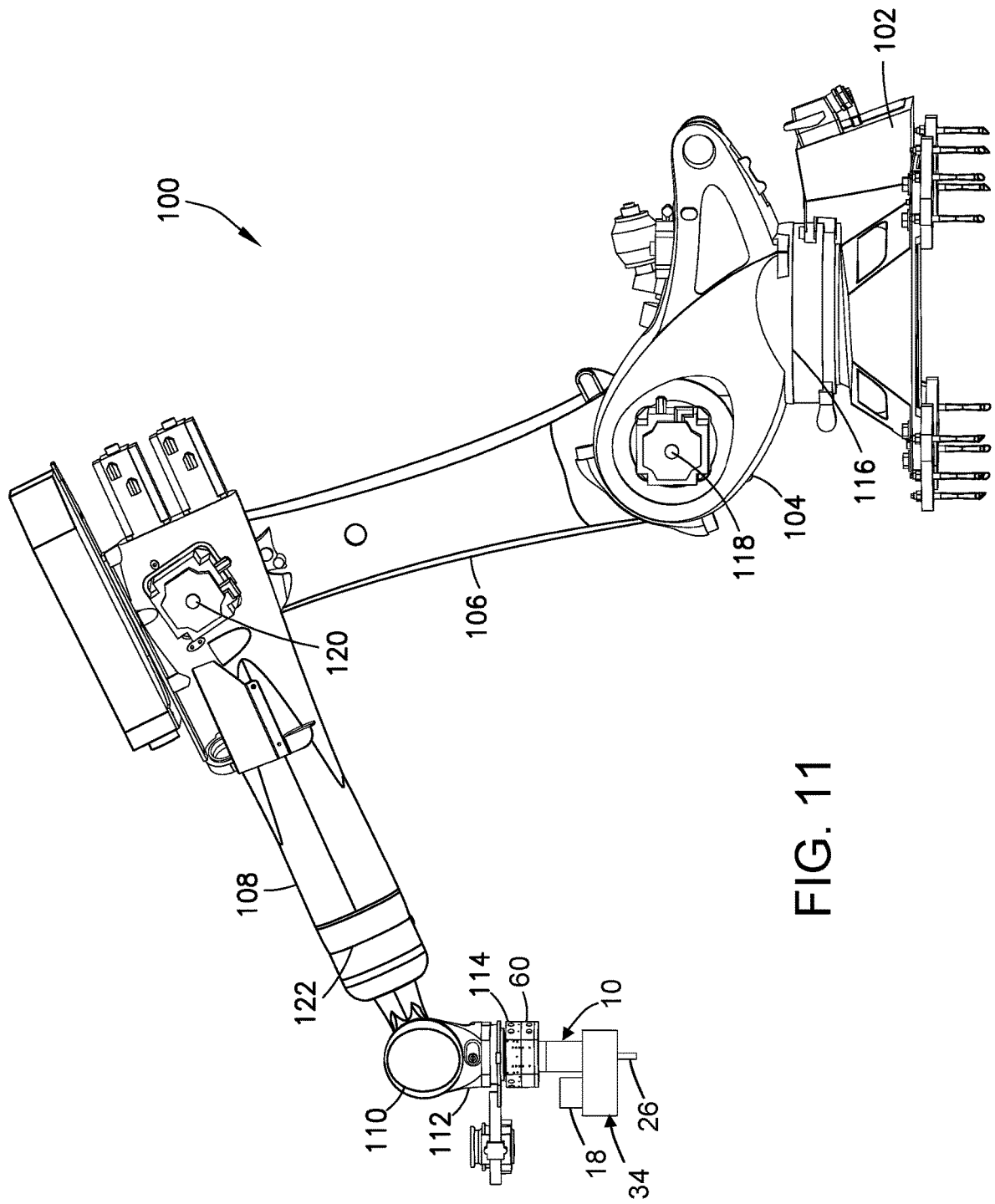
FIG. 11 is a diagram representing an elevational view of the optical instrument of the type depicted in FIG. 8 mounted to a robot.

FIG. 11 is a diagram representing an elevational view of the optical instrument 50D mounted to a robot 100. The optical instrument 50D is attached to the robot 100 by attaching a tool-side connector plate 60 to a connector 114 of the robot 100. While the optical probe 26 is stationary inside a hole, image data is sent to a data acquisition system for processing. Typically, the robot 100 is automatically controlled to move the optical probe 26 into alignment with a hole and then into the hole.

The robot 100 has multi-axis movement capabilities and uses software support to generate a linear profile to be used for scanning a hole. In particular, the robot 100 shown in FIG. 11 comprises a robot base 102, a carousel 104, a rocker 106 (a.k.a. pivot arm), an extension arm 108, a robot hand 110, and a member 112 to which the connector 114 is attached. The robot base 102 and carousel 104 are rotatably coupled by a pivotal coupling 116. The carousel 104 and rocker 106 are rotatably coupled by a pivotal coupling 118. The rocker 106 and extension arm 108 are rotatably coupled by a pivotal coupling 120. The rocker extension arm 108 and robot hand 110 are rotatably coupled by a pivotal coupling 122. The combination of these components provides multiple degrees of freedom, which in turn allows the optical instrument 50D to be moved to different locations and in different directions. The robot 100 includes one or more positional sensors (not shown) at, or otherwise associated with, each of the pivots that provide positional data (X, Y, and Z in three-dimensional space) to the data acquisition system for accurately locating the optical instrument 50D. An example of a robot 100 that could be employed with the optical instruments disclosed herein is robot Model KR-150 manufactured by Kuka Roboter GmbH (Augsburg, Germany), although any robot or other manipulator capable of inserting an optical instrument ultrasonic inspection tool head and communicating with a data acquisition system could be used.

The robot 100 is typically in communication with the data acquisition system to process the image data acquired by the optical instrument 50D and to display the processed data. In many cases, communications cable(s) (not shown in FIG. 11) transmit data between the robot 100 and the data acquisition system. In other embodiments, the data may be transmitted between the robot 100 and the data acquisition system via wireless communications. The robot 100 may be directly connected to the computer system 80 identified in FIG. 10, or indirectly connected, such as via a network.

While methods and apparatus for optical imaging and scanning of holes have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. An optical instrument comprising: a housing; a light source disposed inside the housing; an image sensor disposed inside the housing; a conical mirror disposed outside the housing and having a cone axis; a conical mirror support structure that supports the conical mirror in a fixed position relative to the housing; and an optical subassembly supported by the housing and configured so that light from the light source impinges on the conical mirror and is reflected radially outward by the conical mirror and light propagating radially inward and impinging on the conical mirror is directed onto the image sensor.

2. The optical instrument as recited in claim 1, wherein the conical mirror has a geometric shape which is defined by revolving a line around the cone axis, which line is disposed at an angle equal to 45 degrees relative to the cone axis.

3. The optical instrument as recited in claim 1, wherein: the conical mirror support structure comprises a central post; and the conical mirror is truncated and attached to one end of the central post.

4. The optical instrument as recited in claim 3, wherein the optical subassembly comprises a mirror and first and second lenses disposed along an optical axis that is coaxial with the cone axis and a third lens disposed between the mirror and the light source, the mirror being sized so that light propagating from the conical mirror to the image sensor passes through the first lens, around the mirror and through the second lens.

5. The optical instrument as recited in claim 1, wherein: the conical mirror support structure comprises a circular cylindrical glass tube having a cylinder axis; and the conical mirror is disposed inside the circular cylindrical glass tube so that the cone axis is coaxial with the cylinder axis.

6. The optical instrument as recited in claim 1, wherein the optical subassembly comprises a dichroic mirror and first, second and third lenses which are arranged so that light propagating from the light source to the conical mirror passes through the third lens and is then reflected by the dichroic mirror, and light propagating from the conical mirror to the image sensor passes through the dichroic mirror and then passes through the first and second lenses.

7. The optical instrument as recited in claim 1, wherein the optical subassembly comprises a dichroic mirror and first, second and third lenses which are arranged so that light propagating from the light source to the conical mirror passes through the third lens and then through the dichroic mirror, and light propagating from the conical mirror to the image sensor is reflected by the dichroic mirror and then passes through the first and second lenses.

8. The optical instrument as recited in claim 4, further comprising an aperture plate, wherein the third lens is disposed between the aperture plate and the light source.

9. The optical instrument as recited in claim 1, wherein the conical mirror is configured to be positioned at a first depth in a hole of a composite substrate with a cone axis being coaxial with a center line of the hole, and light from the light source is directed to illuminate the conical mirror with light that is reflected outwardly and focused on a focal plane inside the hole.

10. The optical instrument as recited in claim 9, wherein the conical mirror is configured to cause light from the light source to be reflected radially outwardly encompassing an angle of 360 degrees.

11. The optical instrument as recited in claim 9, wherein the conical mirror is configured to direct light reflected axially upward onto the image sensor, and the image sensor is configured to convert light impinging the image sensor into electrical signals that represent pixel data of a first distorted sub-image of a first portion of the hole having conical optical distortion.

12. The optical instrument as recited in claim 11, wherein the first portion of the hole is an annular surface that extends from a first depth to a second depth.

13. The optical instrument as recited in claim 11, further comprising a computer system having an image processor, configured to process the pixel data of the first distorted sub-image to produce pixel data representing a first planarized sub-image without conical distortion.

14. The optical instrument as recited in claim 13, further comprising a display device, where the first planarized sub-image without conical distortion is displayed on the display device.

15. The optical instrument as recited in claim 13, further comprising motors for causing the optical instrument to move for positioning the optical instrument relative to the hole.

\* \* \* \* \*